United States Patent Office 2,710,724
Patented June 14, 1955

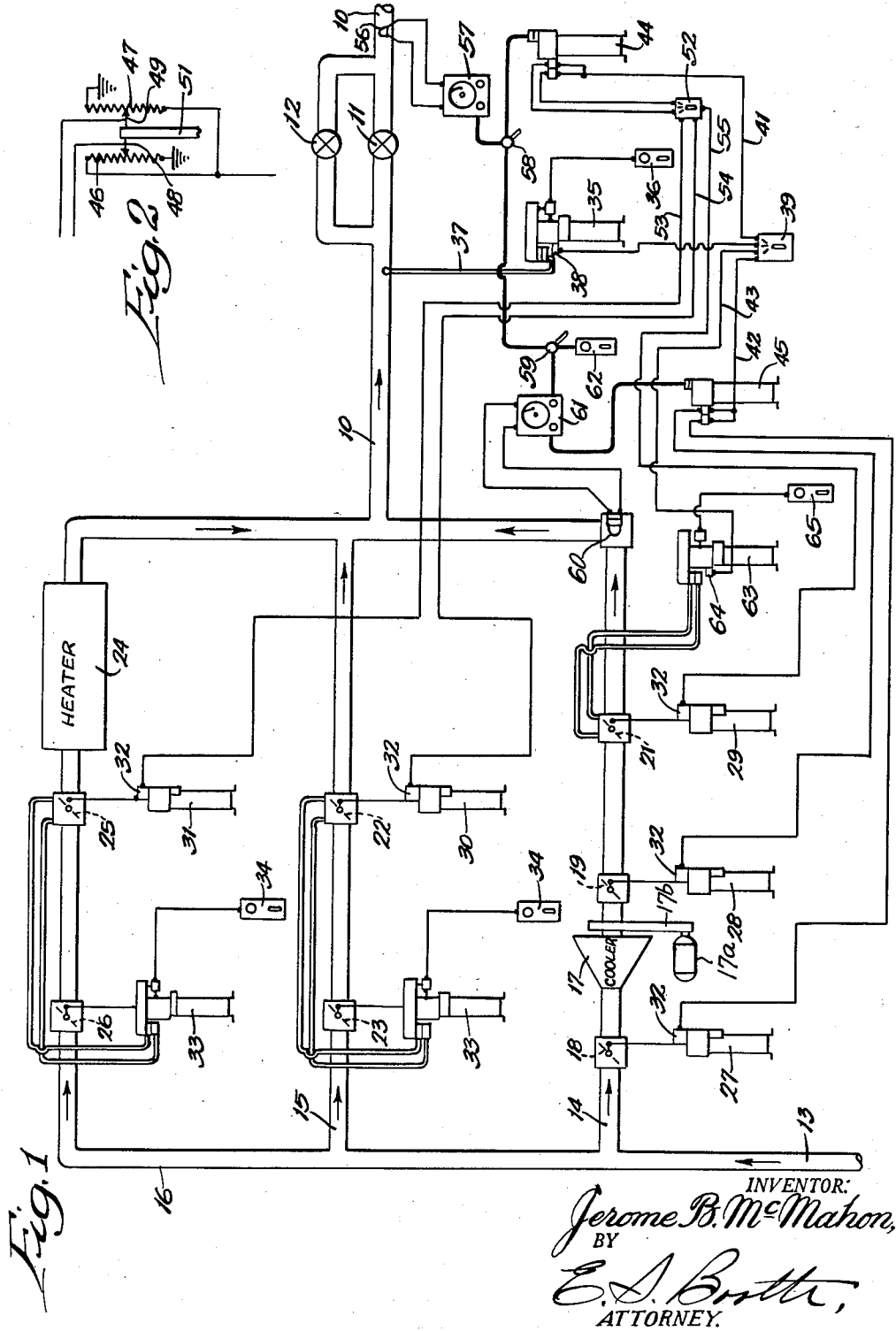

2,710,724
APPARATUS FOR CONTROLLING THE CHARACTER OF A FLUID

Jerome B. McMahon, Wilmette, Ill., assignor to Republic Flow Meters Company, Chicago, Ill., a corporation of Illinois Application May 19, 1951, Serial No. 227,207

6 Claims. (Cl. 236—13)

This invention relates to apparatus for controlling the character of a fluid and particularly to apparatus for controlling independent characteristics of mixed fluids.

There are many applications where it is desirable to control independent characteristics of a fluid or of a mixture of individual fluids having different characteristics. As one example in connection with which the invention is illustrated, it is desirable to provide a flow of air at predetermined controlled temperatures and pressures for wind tunnel tests. It is to be understood however that the principles of the invention are not limited to this precise application but can be used advantageously in connection with many other types of applications.

It is one of the objects of the invention to provide an apparatus in which the same control devices are utilized to control different characteristics of a fluid or of a mixture of fluids.

According to one specific feature of the invention, the same control valves are operated simultaneously in the same direction to control the total flow or pressure of a fluid or a mixture of fluids and are moved simultaneously in opposite directions to control a different characteristic of the fluid or the mixture such as its temperature.

According to another feature, a pair of control valves are operated simultaneously to control the total flow through an expander and are moved relative to each other to control the pressure drop across the expander.

Another object is to provide an apparatus in which one control instrument responsive to a characteristic of the fluid controls the set point of a second instrument which in turn controls the characteristic of the fluid. This arrangement is of particular advantage where the distance between the point of control and of ultimate use of the fluid is substantial.

The above and other objects and features of the invention will be more readily apparent from the following description when read in connection with the accompanying drawing, in which:

Figure 1 is a diagrammatic view of a control system for controlling the supply of air to a wind tunnel or the like; and Figure 2 is a partial diagrammatic view of a ratio divider.

As shown, a conduit 10 is provided which may be a wind tunnel or a supply conduit for supplying air to the wind tunnel. Flow through the conduit 10 is regulated by a main flow valve 11 and a bypass valve 12 which bypasses the valve 11. The valves 11 and 12 may be set manually or in any other desired manner to produce the amount of flow desired in the wind tunnel.

Air is supplied through a supply conduit 13 connected to suitable pumps or blowers and which may recirculate air from the wind tunnel or a mixture of atmospheric air and air discharged from the tunnel. The air supplied through the conduit 13 may flow through any one of several branches 14, 15, and 16, which are connected in parallel between the supply conduit 13 and the main conduit 10.

The branch conduit 14 is for cooled air and for purposes of cooling the air an expander 17 is connected in this conduit. In the expander 17 the air is expanded from its original pressure and is caused to do work as for example by driving a generator 17a through a belt 17b during expansion so that its temperature will be reduced. Flow of air through the expander is controlled by an inlet valve 18 and an outlet valve 19, which can be adjusted relative to each other to control the pressure drop across the expander, thereby to control the temperature of the air. Preferably a flow control valve 21 is provided in the conduit 14 posterior to the outlet valve 19 which is utilized during portions of the operation to regulate total flow of collected air.

The branch conduit 15 is adapted to conduct air at supply pressure and temperature to the main conduit 10. To control flow through the branch conduit 15, a control valve 22 is placed therein. Preferably a regulating valve 23 is placed ahead of the control valve 22 to maintain the pressure drop across the valve 22 constant regardless of its position. With this construction, the position of the valve 22 can control accurately the flow through the conduit 15.

The branch conduit 16 is for heated air and to heat the air a heating unit 24 is provided therein. This may be any conventional type of heat exchange unit which will raise the air to the desired temperature. Flow of heated air is controlled by a valve 25, ahead of which there is provided a regulating valve 26 to maintain the drop across the valve 25 constant.

The several control valves 18, 19, 21, 22, and 25, are controlled by positioning type regulators indicated at 27, 28, 29, 30 and 31 respectively. These regulators may be of identical construction, substantially as shown and claimed in the patent to Rosenberger, No. 2,220,176. Each of the regulators is loaded by an electrical loading unit 32, the voltage on which determines the position of the regulator and of its corresponding valve.

The valves 23 and 26 are controlled by regulators 33, which are responsive to manually set loading pressures controlled by manual setting units 34 and to the differential pressures across the valves 22 and 25 respectively. These regulators function to control the valves 23 and 26 so that the drops across the corresponding control valves 22 and 25 will be maintained at the value determined by the setting of the manual setting units 34.

The pressure of the air in the main conduit 10 ahead of the valves 11 and 12 is controlled by a regulator 35 which is similar to the regulators 33 and is loaded by a manual setting unit 36. The manually set loading pressure is balanced against the pressure in the conduit to which the regulator 35 is connected by a pipe 37 and the regulator controls an electrical unit 38 to produce a regulating force or voltage which is transmitted to a transfer switch 39. Through the transfer switch the regulating voltage produced by the unit 38 can be supplied to a line 41 or to a line 42 for different operations. In addition the transfer switch can connect a line 41 with a line 43 for still another type of operation. The lines 41 and 42 are connected respectively to voltage dividers 44 and 45 which may be of identical construction. Each of these units comprises a positioning type regulator similar to the regulators 37—31 and which controls slide wires to divide an incoming voltage into a pair of output or controlling voltages. As illustrated diagrammatically in Figure 2, each voltage divider may include a pair of resistors 46 and 47 connected oppositely. Wipers 48 and 49 are slidable over the resistors respectively and are moved simultaneously by an operating arm 51 which is moved by the regulator. With this construction, the two voltages will always equal the same total and will be varied oppositely as the slide wires are moved.

The two output voltages from the voltage divider 44 are supplied to a transfer switch 52 which has three output lines 53, 54, and 55, to supply the voltages to different of the operating units for different operations. The wire 53 is connected to the loading unit 32 of the regulator 31, the wire 54 is similarly connected to the loading unit of the regulator 30 and the wire 55 is connected to the loading unit of the regulator 29. The output or control voltages from the ratio divider 45 are supplied directly to the loading units for the regulators 27 and 28 as shown.

The position of the voltage divider regulator 44 is determined in accordance with the temperature of the air in the main conduit 10. For this purpose, a temperature sensing unit as indicated at 56 is mounted in the conduit 10 posterior to the valves 11 and 12, and controls a temperature responsive instrument 57 which may be any one of a number of commercial instruments which produce a regulated fluid pressure proportional to the voltage. The regulated pressure from the instrument 57 is connected through a three way valve 58 either to the loading diaphragm of the regulator 44 or through a second three way valve 59 to a second instrument 61 which may be of the same general type as the instrument 57. When the valves 58 and 59 are adjusted to supply the pressure from the instrument 57 to the regulator 44, the ratio of output voltages from the regulator or ratio divider 44 will be changed in response to the air temperature; when the valves 58 and 59 are turned to their other position the output pressure from the instrument 57 is supplied to the instrument 61 to serve as a loading pressure, therefore to adjust the set point of the instrument 61 to correspond to the temperature of air in the conduit 10. The instrument 61 is also responsive to the temperature of the air adjacent to the control valve 21 and for this purpose is connected to a temperature sensing element 60 in the pipe 14. The instrument 61 supplies a loading pressure to the ratio divider 45 which varies with the differential between the temperatures in the conduit 10 and in the conduit 14. When the valve 59 is turned to its other position, it connects the instrument 61 to a manually adjustable loading unit 62 which can be manually adjusted to determine the set point of the instrument. Under these conditions, the loading pressure supplied by the instrument 61 will vary with the difference between the manually set temperature and the existing temperature in the conduit 14.

A second regulator 63, similar to the regulator 35 controls an electrical unit 64 to provide a regulating voltage to the wire 43. This regulator is responsive to the pressure drop across the control valve 21 and to a manually adjustable loading pressure supplied by a manual control unit 65.

The apparatus, as shown, is capable of several different types of operations in one of which a mixture of the supplied air from conduit 13 and heated air is provided to the conduit 10 at predetermined temperature and pressure. In this operation, the valve 58 is turned to connect the instrument 57 to the ratio divider 44, the transfer switch 39 is turned to connect the unit 38 to the wire 41 and the transfer switch 52 is turned to connect the output voltages from the ratio divider 44 to the wires 53 and 54. At this time, no air will flow through the branch conduit 14 so that the expander is not in operation.

Pressure in the main conduit 10 will be controlled through the regulator 35 by varying the voltage or regulating force supplied through the wire 41 to the ratio divider 44. As this voltage changes the voltage supplied to the regulators 30 and 31 will be changed simultaneously in the same direction so that the valves 22 and 25 will be moved simultaneously in the same direction. This will cause an increase or decrease in the total amount of air supplied without changing the ratio of heated air to supply air so that the temperature of the mixture will not be affected.

The temperature of the mixture is measured by the instrument 57 and if it is not at the desired value the control pressure supplied to the ratio divider 44 will cause movement thereof to change the ratio of the controlling voltages supplied to the regulators 30 and 31. This will cause one of the valves 22 and 25 to open while the other closes to change the relative amounts of supplied air and heated air so that the temperature of the mixture will be brought back to the desired value as determined by the setting of the instrument 57. Thus, in this operation, the temperature and pressure of the air supplied to the main conduit 10 are accurately controlled through the same control valves.

In the second operation, cold air may be supplied through the branch conduit 14 up to the limit of capacity of the expander 17, as for example when the coldest possible air is desired. In this operation, no air will flow through the conduits 15 or 16 and only the conduit 14 will be effective. For this purpose, the transfer switch 39 is positioned to connect the regulator 35 to the ratio divider 45 and the valves 58 and 59 are positioned to connect the instrument 57 to the instrument 61. Pressure of the air supplied to the conduit 10 is controlled through the regulator 35 and ratio divider 45 by simultaneously varying the controlling voltages supplied to the regulators 27 and 28 to cause the valves 18 and 19 to move in the same direction. This will vary the total amount of air passing through the branch conduit 14 without changing the pressure drop across the expander 17 and thereby without changing the air temperature.

The instrument 61 tends to maintain the temperature of the air in the branch conduit 14 constant. For this purpose, the instrument varies the loading pressure supplied to the ratio divider 45 so that the ratio of the voltages supplied to the regulators 27 and 28 will be changed to move the valves 18 and 19 relative to each other. This movement will alter the pressure drop across the expander and will thereby control the amount of cooling. If the temperature of the ultimate air in the conduit 10 is not at the desired value, the loading pressure applied to the instrument 57 by the instrument 61 will be changed to change the set point of the instrument 61. The instrument 61 will thereby control the valves 18 and 19 to maintain the temperature in the conduit 14 at such a value that when the air reaches the conduit 10, it will be at the desired temperature. This is particularly advantageous in relatively large installations where the temperature drop between the expander and the ultimate point of use may vary with conditions, since it provides a very rapid and accurate control.

For the third type of operation, it may be desired to mix cool air with air from the supply conduit 13 and to maintain the temperature and pressure constant. For this operation, the valve 58 is turned to connect the instrument 57 with the ratio divider 44 and the transfer switch 52 is adjusted to supply the output voltages from the ratio divider 44 to the regulator 30 and the regulator 29. Under these conditions the valves 21 and 22 will be controlled in the manner described above under the first operation, correctly to adjust the valves 21 and 22 to maintain both the temperature and pressure of the mixed air at the desired value.

Additionally during this operation, the valves 18 and 19 are controlled simultaneously to maintain the pressure drop across the valves 21 constant and are adjusted relative to each other to maintain the temperature of the air in the conduit 14 constant. For the first purpose, the transfer switch 39 is adjusted to connect the voltage supply unit 64 of the regulator 63 to the ratio divider 45. Thus, upon any change in pressure drop across the valve 21, the valves 18 and 19 will be moved simultaneously in the same direction to change the total flow through the expander without changing the pressure drop across it.

For the second purpose, the valve 59 is turned to connect the instrument 61 to the manual loading unit 62. The loading pressure supplied to the regulator 45 will therefore be proportional to the temperature of air in the branch conduit 14 and if the temperature is not at the desired value, the ratio divider will be adjusted to change the relative positions of the valves 18 and 19. This will change the pressure drop across the expander to the amount necessary to bring the temperature back to the desired value.

While one embodiment of the invention has been shown and described in detail, it will be understood that this is illustrative only and is not to be taken as a definition of the scope of the invention, reference being had for this purpose to the appended claims.

What is claimed is:

1. Apparatus for controlling the characteristics of a fluid delivered through a conduit system comprising a pair of control valves positioned in different parts of the conduit system and whose simultaneous adjustment affects one characteristic of the fluid and whose relative adjustment affects a second characteristic of the fluid, regulators to adjust the control devices respectively, a control instrument connected to the conduit and responsive to said one characteristic of the fluid therein to produce a regulating force proportional to said one characteristic of the fluid, a ratio divider connected to the control instrument to divide the regulating force into two controlling forces, adjustable means in the ratio divider connected to the conduit and responsive to said second characteristic of the fluid therein to vary the ratio of the controlling forces, and connections from the regulators to the ratio divider to supply the controlling forces to the regulators respectively.

2. Apparatus for controlling the temperature and pressure of a mixture of fluids of different temperatures comprising a mixing conduit, a pair of supply ducts communicating with the mixing conduit to supply individual fluids thereto, a pair of control valves in the ducts respectively controlling the supply of the individual fluids, regulators connected to the valves respectively to adjust them, a control instrument responsive to the pressure of the mixture in the conduit to produce a regulating force, a ratio divider connected to the control instrument to divide the regulating force into two controlling forces, adjustable means in the ratio divider responsive to the temperature of the mixture in the conduit to vary the ratio of the controlling forces, and connections from the regulators to the ratio divider to supply the controlling forces to the regulators respectively.

3. Apparatus for controlling the temperature of air in a conduit comprising an expander in the conduit, work absorbing means connected to the expander, inlet and outlet valves in the conduit anterior and posterior to the expander, regulators connected to the valves to operate them, an instrument responsive to the temperature of the air in the conduit to produce a regulating force, a ratio divider to produce two controlling forces and connected to the instrument to vary the ratio of the controlling forces in response to the regulating force, and connections from the regulators to the ratio divider to supply the controlling forces to the regulators respectively.

4. Apparatus for controlling the temperature of air in a conduit comprising an expander in the conduit, work absorbing means connected to the expander, inlet and outlet valves in the conduit anterior and posterior to the expander, regulators connected to the valves to operate them, an instrument responsive to the pressure of the air in the conduit to produce a regulating force, a ratio divider connected to the instrument to divide the regulating force into two controlling forces, means in the ratio divider to change the ratio of the controlling forces, a second instrument responsive to the temperature of the air in the conduit connected to the last named means to operate it in response to the air temperature, and connections from the ratio divider to the regulators to supply the controlling forces to the regulators respectively.

5. Apparatus for controlling the temperature of air in a conduit comprising an expander in the conduit, work absorbing means connected to the expander, inlet and outlet valves in the conduit anterior and posterior to the expander, regulators connected to the valves to operate them, a ratio divider connected to the regulators to supply controlling forces thereto, an instrument responsive to the temperature of the air in the conduit connected to the ratio divider to vary the ratio of the controlling forces, a control valve in the conduit posterior to the outlet valve, and means responsive to the pressure in the conduit posterior to the control valve to control the control valve.

6. Apparatus for controlling the temperature of air in a conduit comprising an expander in the conduit, work absorbing means connected to the expander, inlet and outlet valves in the conduit anterior and posterior to the expander, regulators connected to the valves to operate them, a control valve in the conduit posterior to the outlet valve, means responsive to the pressure in the conduit posterior to the control valve to control the control valve, a controller responsive to the pressure drop across the control valve to produce a regulating force, a ratio divider connected to the controller to divide the regulating force into two controlling forces, an instrument responsive to temperature of the air in the conduit connected to the ratio divider to vary the ratio of the controlling forces, and connections from the regulators to the ratio divider to supply the controlling forces to the regulators.

References Cited in the file of this patent

UNITED STATES PATENTS

| | | |
|---|---|---|
| 2,314,569 | Baker | Mar. 23, 1943 |
| 2,412,071 | Warner et al. | Dec. 3, 1946 |
| 2,440,052 | Lingen et al. | Apr. 20, 1948 |
| 2,474,441 | Sparrow | June 28, 1949 |
| 2,476,044 | Kals | July 12, 1949 |
| 2,484,850 | Paget | Oct. 18, 1949 |
| 2,499,832 | Palmatier | Mar. 7, 1950 |
| 2,508,074 | Miller et al. | May 16, 1950 |
| 2,526,099 | Vinson | Oct. 17, 1950 |
| 2,529,592 | Boyle | Nov. 14, 1950 |
| 2,572,253 | Fellows et al. | Oct. 23, 1951 |
| 2,584,420 | Branson | Feb. 5, 1952 |